United States Patent [19]
O'Brien

[11] Patent Number: 5,596,756
[45] Date of Patent: Jan. 21, 1997

[54] SUB-BUS ACTIVITY DETECTION TECHNIQUE FOR POWER MANAGEMENT WITHIN A COMPUTER SYSTEM

[75] Inventor: Rita M. O'Brien, Austin, Tex.

[73] Assignee: Advanced Micro Devices, Inc., Sunnyvale, Calif.

[21] Appl. No.: 274,222

[22] Filed: Jul. 13, 1994

[51] Int. Cl.$^6$ .................................................. G06F 12/02
[52] U.S. Cl. ...................... 395/750; 395/800; 395/309; 395/310
[58] Field of Search ................................. 395/750, 800, 395/309, 310

[56] References Cited

U.S. PATENT DOCUMENTS

| | | | |
|---|---|---|---|
| 5,051,890 | 9/1991 | Nagasaki et al. | 395/425 |
| 5,125,080 | 6/1992 | Pleva et al. | |
| 5,392,446 | 2/1975 | Tower et al. | 395/800 |
| 5,410,711 | 4/1995 | Stewart | 395/750 |

FOREIGN PATENT DOCUMENTS

| | | |
|---|---|---|
| 0230351 | 7/1987 | European Pat. Off. |
| 0588084A2 | 3/1994 | European Pat. Off. |
| 56-143073 | 7/1981 | Japan |

Primary Examiner—Jack B. Harvey
Assistant Examiner—Jeffrey K. Seto
Attorney, Agent, or Firm—Conley, Rose & Tayon, P.C.; B. Noel Kivlin

[57] ABSTRACT

The computer system includes an integrated processor coupled to a power management unit and at least one peripheral device. The integrated processor includes a bus interface unit that provides an interface to a high performance peripheral interconnect bus with multiplexed address/data lines. The peripheral interconnect bus, which may be a PCI standard bus, accommodates data transfers between an internal bus of the integrated processor and PCI peripheral devices. The integrated processor further includes a sub-bus control unit that generates a set of side-band control signals that allow the external derivation of a lower performance secondary bus, such as an ISA bus, without requiring a complete set of external pins for the secondary bus on the integrated processor. The derivation of the secondary bus is accomplished with an external data buffer and an external address latch which are controlled by the side-band control signals. Separate address and data lines from the integrated processor for the secondary bus are not required. Accordingly, high performance peripheral devices are supported by the integrated processor as well as lower performance, lower-cost peripherals without a significant increase in the pin-count of the integrated processor.

13 Claims, 3 Drawing Sheets

SUB-BUS ACTIVITY DETECTION TECHNIQUE FOR POWER MANAGEMENT WITHIN A COMPUTER SYSTEM

CROSS-REFERENCE TO RELATED APPLICATIONS

This application is related to commonly assigned U.S. patent application Ser. No. 08/190,647, filed Feb. 2, 1995.

BACKGROUND OF THE INVENTION

1. Field of the Invention

This invention relates to power management within computer systems. The invention also relates to integrated processing systems and more particularly to power management within integrated processing systems that support the derivation of an external peripheral bus from a system interconnect bus.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMUs). One specific power reduction technique involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical, and another technique involves the capability of removing power from inactive circuit portions.

Power managed computer systems that employ the above-described power reduction techniques typically monitor various activities at the point of use or by snooping centralized buses. For example, an activity monitor of a power management unit may be connected directly to various control lines associated with the microprocessor and peripheral devices to determine whether certain activities are occurring. Depending upon the detected activities, the power management unit may responsively power down selected circuit portions, reduce the frequencies of selected clock signals and/or completely stop selected clock signals. The power management unit is also typically configured to save the status of selected write-only and/or other configuration registers of a particular peripheral device before the peripheral is powered down. This allows the peripheral device to be powered back on to its original state without reconfiguration.

In recent years, integrated processors have been developed to replace previously discrete microprocessors and associated peripheral devices within computer systems. An integrated processor is an integrated circuit that performs the functions of both a microprocessor and various peripheral devices such as, for example, a memory controller, a DMA controller, a timer, and a bus interface unit, among other things. The introduction of integrated processors has allowed for decreases in the overall cost, size, and weight of computer systems, and has in many cases accommodated improved performance characteristics of the computer systems.

Integrated processors typically include a system interconnect bus available at the pins the integrated circuit package which accommodates the connection of various peripheral devices to the integrated processor. To maintain broad compatibility of the integrated processor and to support low-cost systems, the integrated processor may also support the external derivation of an additional, industry-standard peripheral bus as in commonly assigned U.S. patent application Ser. No. 08/190,647, filed Feb. 2, 1995. The additional peripheral bus, which is referred to as a sub-bus, is derived from the system interconnect bus and is supported with external address and data buffers as well as a set of sub-bus control-signals generated by the integrated processor.

A problem encountered in managing power within computer systems that incorporate peripheral sub-busses is that an external power management unit must typically be capable of monitoring activities of both the system interconnect bus and the peripheral sub-bus to determine whether a power management state-change should occur and to shadow write-only registers incorporated within peripheral devices coupled to the sub-bus. Although external package pins could be incorporated on the power management unit to provide external access separately to each of the various lines of the system interconnect bus and the peripheral sub-bus, such dedicated pins would result in a significant number of package pins on the power management unit and would require that the die size of the power management unit be increased to accommodate the additional bond wire pads. As a result, a significant cost would be added to the overall cost of the computer system.

SUMMARY OF THE INVENTION

The problems outlined above are in large part solved by a sub-bus activity detection technique for power management within a computer system according to the present invention. In one embodiment, the computer system includes an integrated processor coupled to a power management unit and at least one peripheral device. The integrated processor includes a bus interface unit that provides an interface to a high performance peripheral interconnect bus with multiplexed address/data lines. The peripheral interconnect bus, which may be a PCI standard bus, accommodates data transfers between an internal bus of the integrated processor and PCI peripheral devices. The integrated processor further includes a sub-bus control unit that generates a set of side-band control signals that allow the external derivation of a lower performance secondary bus, such as an ISA bus, without requiring a complete set of external pins for the secondary bus on the integrated processor. The derivation of the secondary bus is accomplished with an external data buffer and an external address latch which are controlled by the side-band control signals. Separate address and data lines from the integrated processor for the secondary bus are not required. Accordingly, high performance peripheral devices are supported by the integrated processor as well as lower performance, lower-cost peripherals without a significant increase in the pin-count of the integrated processor.

The power management unit is also coupled to the PCI bus. The power management unit includes a system monitor which allows the monitoring of all PCI cycles for activity monitoring and for the shadowing of write-only registers. To monitor ISA sub-bus cycles, the system monitor monitors the PCI bus for sub-bus cycles and decodes the command type signals of the PCI bus. The ISA sub-bus reuses PCI signals and command types without signalling PCI start of cycle with the FRAME# signal. To recognize valid data during an ISA sub-bus cycle, an address stepping configuration register within the power management unit is employed to determine whether data is valid upon the clock cycle following the address phase, or whether the data is valid following one, two, or three clock steps. In accordance, versatile power management with respect to sub-bus peripherals may be maintained while minimizing of the overall pin-count of the power management unit.

BRIEF DESCRIPTION OF THE DRAWINGS

Other objects and advantages of the invention will become apparent upon reading the following detailed description and upon reference to the accompanying drawings in which.

Figure 1:
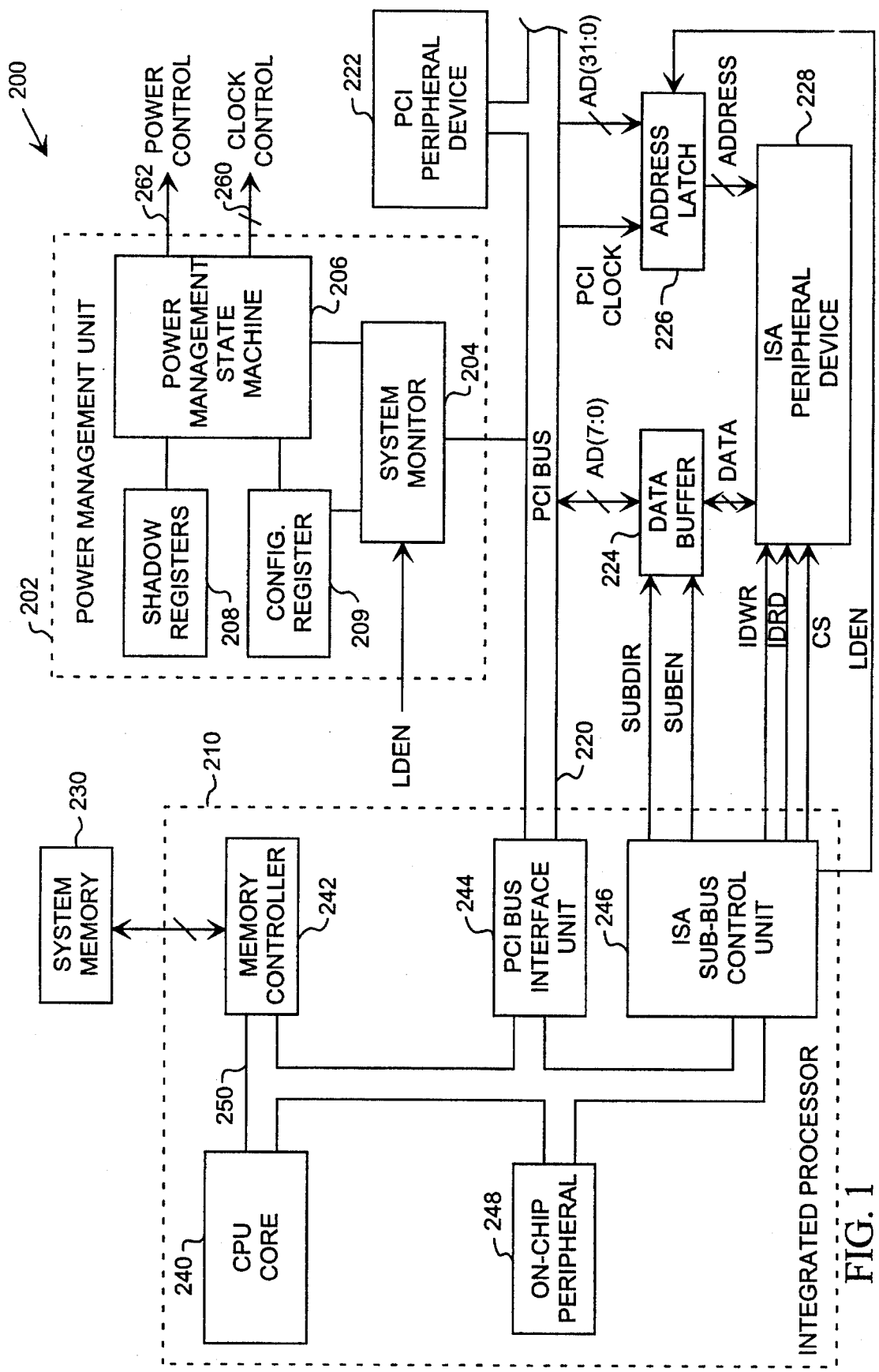
FIG. 1 is a block diagram of a computer system including a computer system in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 200 including a power management unit 202 according to the present invention. In addition to power management unit 202, computer system 200 further includes an integrated processor 210 coupled to a PCI (Peripheral Connect Interface) bus 220, a PCI peripheral device 222, a data buffer 224, and an address latch 226. Computer system 200 finally includes an ISA peripheral device 228 and a system memory 230 coupled to integrated processor 210.

In its illustrated form, power management unit 202 includes a system monitor 204 coupled to PCI bus 220, and a power management state machine 206 coupled to system monitor 204. Power management unit 202 further includes a shadow registers unit 208 and a configuration register 209 coupled to power management state machine 206.

Generally speaking, power management unit 202 is provided for managing and minimizing the power consumed by computer system 200. Power management unit 202 generates a set of clock control signals at lines 260 and a set of power control signals at lines 262. The clock control signals and the power control signals are used, respectively, to control the frequencies of selected clock signals and to control the application of power to selected circuit portions and peripheral devices. For example, in one embodiment, the clock control signals are used to control the frequencies of a CPU clock signal and a system clock signal. The CPU clock signal clocks CPU core 240, and the system clock signal clocks, for example, peripheral devices 222 and 228. In addition the power control signals are provided to control the application of power to PCI peripheral device 222 and ISA sub-peripheral device 228. Further details regarding power management unit 202 will be provided below.

Integrated processor 210 includes a CPU core 240 coupled to a memory controller 242, a PCI bus interface unit 244, an ISA sub-bus control unit 246, and an on-chip peripheral device 248 via an internal bus 250. Each of the illustrated components of integrated processor 210 are fabricated on a single integrated circuit and are housed within a common integrated circuit package. In the embodiment shown, CPU core 240 implements a model 80486 microprocessor instruction set. Bus 250 is a model 80486-style local bus. It is understood, however, that CPU core 240 could be configured to implement other microprocessor-type instruction sets.

PCI bus interface unit 244 provides an interface between the CPU local bus 250 and PCI bus 220. As such, PCI bus interface unit 244 orchestrates the transfer of data, address, and control signals between CPU local bus 250 and PCI bus 220. PCI bus 220 is referred to generally as a system interconnect bus in that it allows the connection of external peripheral devices to integrated processor 210. Details regarding PCI bus 220 are provided within the publication entitled "PCI Local Bus Specification"; PCI Special Interest Group; Hillsboro, Oregon; 1993. This publication is incorporated herein by reference in its entirety.

On-chip peripheral 248 is illustrative of any one of a variety of peripheral devices that may be incorporated within integrated processor 210. For example, peripherals such as a direct memory access controller, an interrupt controller, and a timer could be included as an integral portion of integrated processor 210.

Memory controller 242 controls the transfer of data between CPU local bus 250 and system memory 230. Since memory controller 242 and CPU core 240 are fabricated on a common integrated circuit, the performance of each is scaled similarly with variations in process technology.

As will be explained in further detail below, ISA sub-bus control unit 246 generates a set of signals labeled SUBDIR, SUBEN, and LDEN, along with an I/O read signal IORD, an I/O write signal IOWR, and a chip select signal CS. These signals are referred to collectively as ISA side-band signals. The ISA side-band signals allow data transfers to or from the external ISA peripheral device 228 by controlling the transfer of data and address signals between PCI bus 220, data buffer 224, and address latch 226. The ISA sub-bus control unit 246 is synchronized with the PCI bus interface unit 244 to ensure proper timing of the side-band signals SUBDIR, SUBEN, LDEN, IOWR, IORD, and CS. The ISA-style signals IOWR, IORD, and CS, along with the data and address signals to ISA peripheral device 228 are referred to collectively as an ISA peripheral sub-bus. As used herein, the term "sub-bus" refers to any external bus which is derived from a system interconnect bus.

Data buffer 224 is a multi-bit, bidirectional buffer which channels data signals between PCI bus 220 and ISA peripheral device 228. Data buffer 224 is enabled by the side-band signal SUBEN, and the directionality of data buffer 224 is controlled by the side-band signal SUBDIR. It is noted that for situations in which ISA peripheral device 228 is an 8-bit peripheral, data buffer 224 is an 8-bit buffer and may be coupled to the lower 8-bits (AD[7:0]) of the multiplexed address/data lines of PCI bus 220. For situations in which ISA peripheral device 228 is a 16-bit peripheral, data buffer 224 is a 16-bit buffer and may be coupled to the PCI bus lines AD[15:0].

Address latch 226 is a multi-bit latching circuit which provides address signals from PCI bus 222 to ISA peripheral device 228. For the embodiment of FIG. 1, address latch 226 may be up to a 32-bit latch; however, it is noted that address latch 226 need only support the number of addressing lines required by the ISA peripheral device. Address latch 226 is enabled by the loading signal LDEN and is clocked by the PCI clock signal PCICLK. Address latch 226 may be implemented with a set of type '377 D latches.

Details regarding the data, address, and control signals associated with integrated processor 210, PCI bus 220, data buffer 224, address latch 226, and ISA peripheral device 228 are next considered. The multiplexed address/data (A/D) lines of PCI bus 220 are connected to an input port of address latch 226. The clock signal PCICLK is connected to a clock input of address latch 226, and the load enable signal LDEN generated by ISA sub-bus control unit 246 is coupled to the enable input of address latch 226. An output port of address latch 226 is coupled to an address port of ISA peripheral device 228.

The multiplexed address/data (A/D) lines of PCI bus 220 are additionally coupled to data buffer 224. In the embodiment shown, ISA peripheral device 228 is an 8-bit device, and thus the low order 8-bits of the multiplexed address/data lines (AD[7:0]) of PCI bus 228 are coupled to data buffer 224. A second port of data buffer 224 is coupled to a data port of ISA peripheral device 228. The data enable signal SUBEN and the data direction signal SUBDIR generated by ISA sub-bus control unit 246 are respectively coupled to an enable input and a direction input of data buffer 224. As stated previously, these signals control the enabling and directionality of data buffer 224. The chip select signal generated by ISA sub-bus control unit 246 is coupled to the chip select input of ISA peripheral device 228, and the I/O read signal IORD and the I/O write signal IOWR are further coupled to ISA peripheral device 228 for controlling the reading and writing of data into and out of ISA peripheral device 228.

Figure 2:
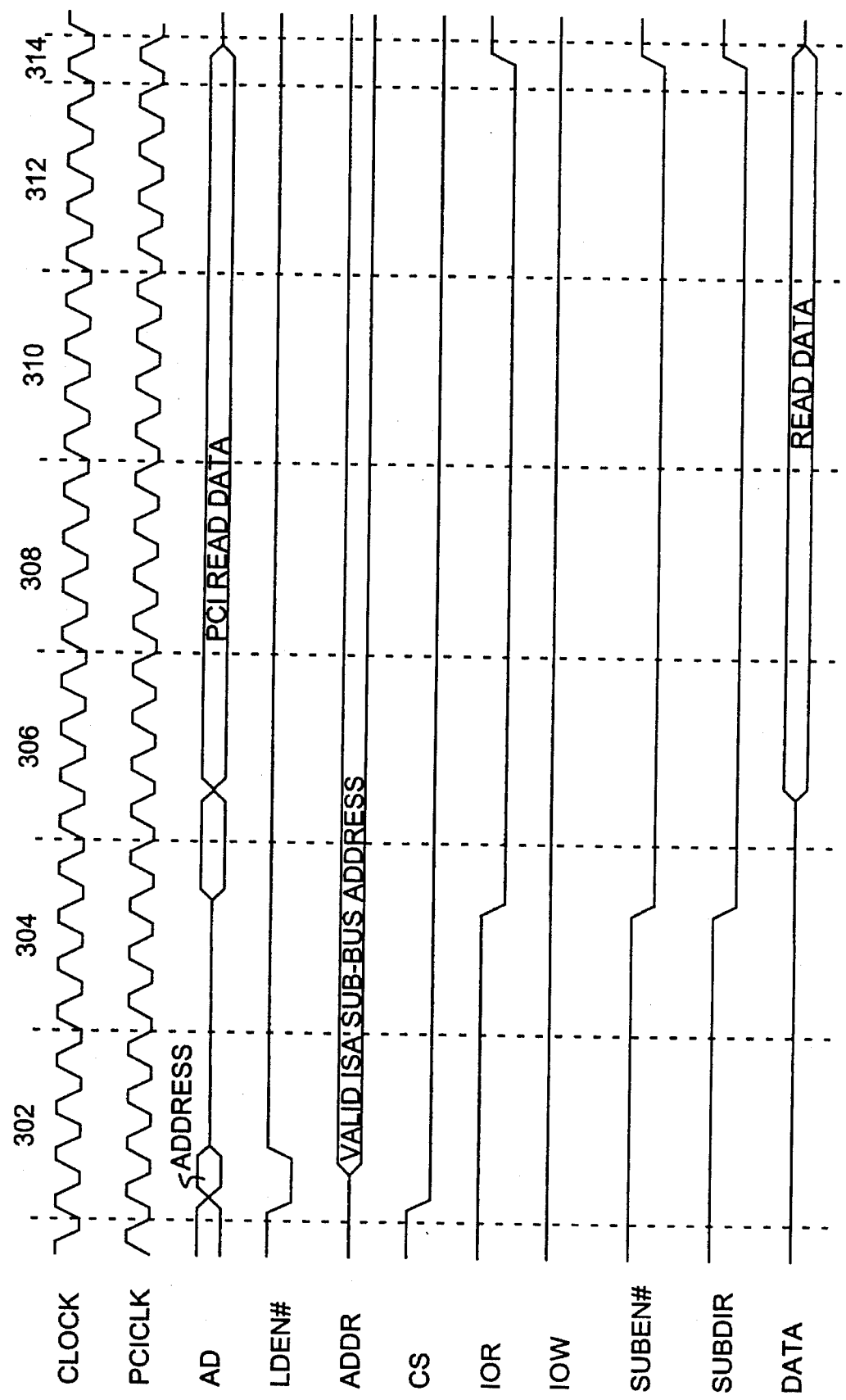
FIG. 2 is a timing diagram that illustrates the generation of address, data, and control signals for a read operation to an ISA peripheral device connected to the integrated processor of FIG. 2.

Referring next to FIG. 2 in conjunction with FIG. 1, the operation of computer system 200 during an ISA peripheral sub-bus cycle is next explained. FIG. 2 is a timing diagram that illustrates the data, address, and control signals associated with an I/O read operation to ISA peripheral device 228. When CPU core 240 initiates a read cycle to the I/O addressable space to which ISA peripheral device 228 is mapped, a valid address signal is driven through the PCI bus interface unit 244 and on to the multiplexed address/data lines AD[31:0] of PCI bus 220 during an ISA sub-bus state 302. At this time, the ISA sub-bus control unit 246 asserts the loading signal LDEN. The valid address signal is thereby latched into address latch 226 synchronously with the rising edge of the PCI clock signal. At the same time the valid address signal is driven on PCI bus 220, the chip select signal CS is asserted low by ISA sub-bus control unit 246 to select peripheral device 228. As illustrated in FIG. 2, the chip select signal CS is asserted low throughout the I/O read cycle to ISA peripheral device 228. Upon the rising edge of the loading signal LDEN, a valid address signal is provided at the output of address latch 226 and to the address port of ISA peripheral device 228.

During the next ISA sub-bus state 304, the I/O read signal IOR as well as the enable signal SUBEN and the data direction signal SUBDIR are asserted low. The ISA peripheral device 228 responsively fetches the data from the requested location, and drives the data through data buffer 224 to the multiplexed address/data lines of PCI bus 220. As illustrated in the figure, the data is driven on the PCI bus 220 during states 306, 308, 310, and 312. When the ISA sub-bus control unit 246 deasserts the I/O read signal IOR during state 314, PCI interface unit 244 latches the data into the integrated processor 210. This completes the ISA sub-bus read operation.

A write operation to ISA peripheral device 228 is similar. It is noted that standard ISA-style bus timing is employed for write cycles to ISA peripheral device 228. It is also noted that during a write cycle, the directional signal SUBDIR is complemented to allow opposite flow of data from PCI bus 220 to ISA peripheral device 228.

The PCI bus interface unit 244 and the ISA sub-bus control unit 246 may further implement an address/data stepping function to determine when valid data will be provided to PCI bus 220. This address/data stepping function may be programmable in accordance with an internal configuration register of integrated processor 210. In one embodiment, the configuration register may be set such that data is valid on PCI bus 220 one clock after the address is valid, or such that either one, two, or three clock steps are provided between when the address on the PCI bus 220 is valid and the time at which data will be valid on PCI bus 220. It is noted that the ISA sub-bus control unit 246 generates data on the AD[31:0] lines in accordance with the particular timing established by the address/data stepping function. Thus, if the bus is heavily loaded, the data may take several clocks to be driven valid, thus requiring one or more clock steps.

The operation of power management unit 202 is next considered. Power management state machine 206 is a control unit that controls the frequencies of various clock signals associated with computer system 200 and which controls the application of power to various peripheral devices associated with computer system 200 depending on the occurrence of selected system activities. Power management state machine 206 may be implemented in a variety of specific configurations. An exemplary power management state machine is described within the co-pending, commonly assigned patent application entitled "Power Management Architecture for Optimal Flexibility"; by Gephardt et al.; Serial No. 08/223,984; filed Apr. 6, 1994. This application is incorporated herein by reference in its entirety.

Power management state machine 206 controls the frequencies of the selected clock signals and the application of power to various peripheral devices based upon various activities detected by system monitor 204. It is noted that power management machine 206 may also control the clock signals and the application of power based upon activities detected by other sources or in response to other control mechanisms (not shown). It is also noted that the response to various detected activities by power management state machine 206 may be programmable or may vary from system to system. For example, power management state machine 206 may be programmed to remove the application of power from PCI peripheral device 222 and from ISA peripheral device 228 if no system activities have been detected for a predetermined time-out period, and may be programmed to slow down the frequency of the CPU clock signal. If keyboard activity is later detected, the power management state machine 206 may be configured to reapply power to PCI peripheral device 222 and ISA peripheral device 228, and to raise the frequency of the CPU clock signal.

System monitor 204 is accordingly configured to detect various activities of computer system 200 such that power management state machine 206 may control the clock signals and the application of power according to its predetermined power management algorithm. More specifically, system monitor 204 is configured to monitor and detect the occurrence of PCI cycles on PCI bus 220 and to monitor and detect the occurrence of an ISA sub-bus cycle. System monitor 204 is further configured to shadow certain configuration data written to PCI peripheral device 222 and ISA peripheral device 228 within the shadow registers unit 208 to maintain the configuration information when PCI peripheral device 222 or ISA peripheral device 228 is powered down. The shadowing of other predetermined registers within the system, such as write-only registers of other peripheral devices, may further be performed by power management unit 202. It is noted that the specific registers to be shadowed may be programmed within power management unit 202.

Since system monitor 204 is connected to PCI bus 220, it is capable of monitoring and detecting any PCI cycle directly in a conventional manner, both for power management functions and for the shadowing of registers associated with PCI peripherals. Thus, depending upon the configuration of computer system 200 and the specific peripheral coupled to PCI bus 220, the system monitor 204 can directly determine the type of PCI cycle which is executing. System monitor 204 passes this information to power management state machine 206, which transitions to another power management state if necessary. When configuration information is written to, for example, selected write-only configuration registers of PCI peripheral device 222, system monitor 204 further detects the write cycle and shadows the configuration data by writing it into an allocated register of shadow registers unit 208. Therefore, if PCI peripheral device 222 is powered down during a power conserving state of power management state machine 206, the configuration information stored within the allocated register of shadow registers unit 208 may be re-written into the write-only configuration register of PCI peripheral device 222 when power is later reapplied. This portion of the operation of system monitor 204 is conventional.

Figure 3:
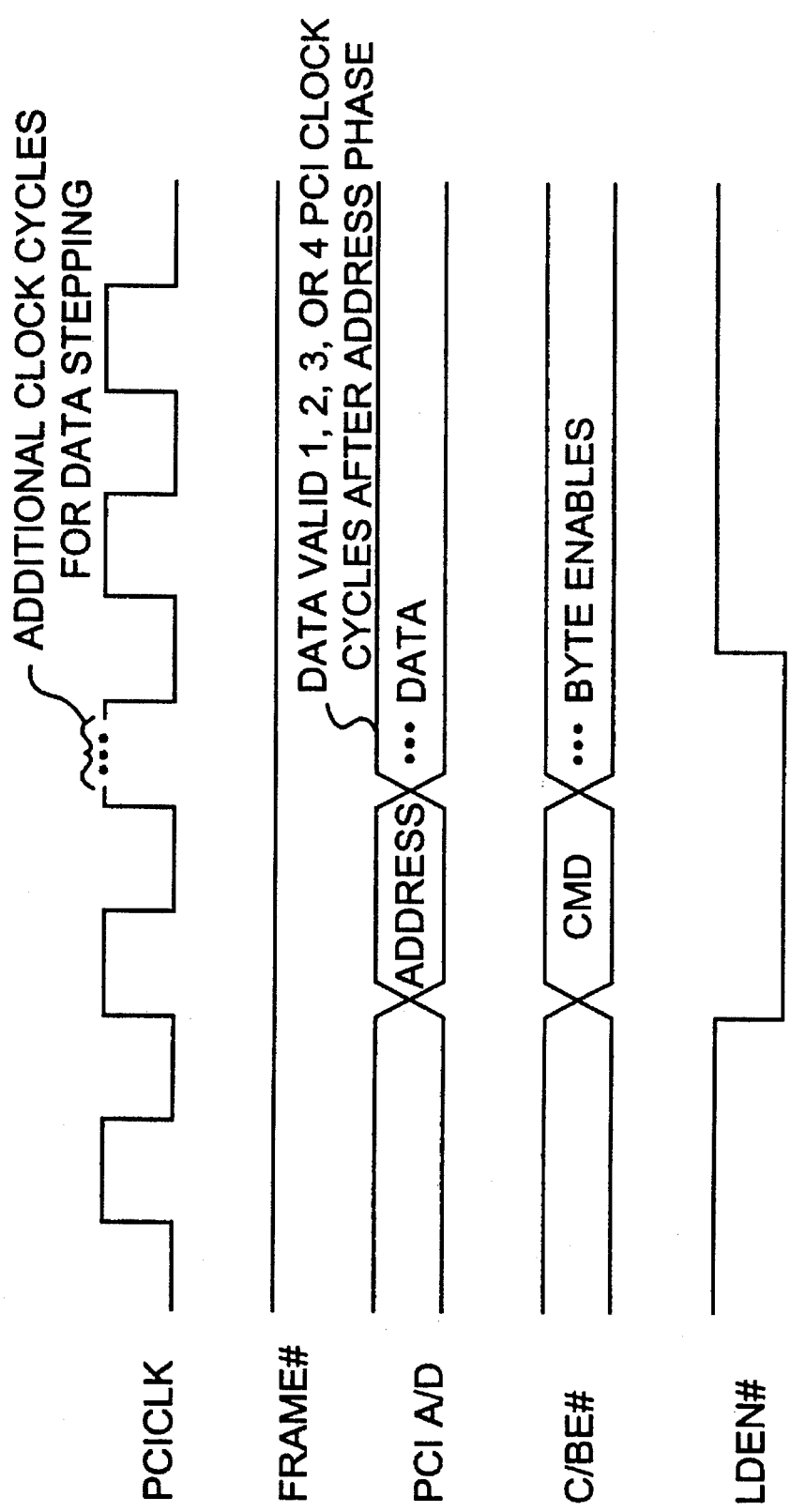
FIG. 3 is a timing diagram that illustrates selected signals monitored by a system monitor during the shadowing of a write-only register to accommodate power management.

System monitor 204 is also configured to detect ISA sub-bus cycles directed to, for example, ISA peripheral device 228. It is noted that the normal ISA control signals CS, IORD and IOWR, and the ISA data and address signals, are not provided directly to the system monitor 204. Accordingly, system monitor 204 detects an ISA sub-bus cycle by monitoring PCI bus 220 and the loading signal LDEN. The beginning of an ISA sub-bus cycle is detected when the LDEN signal goes active low while the PCI FRAME signal remains inactive high. The address associated with the ISA sub-bus cycle is then detected by system monitor 204 on the first rising edge of the PCI clock after the loading signal LDEN goes active low. FIG. 3 is a timing diagram that illustrates signals detected by system monitor 204 during a designated ISA sub-bus cycle. When the start of an ISA sub-bus cycle is detected (i.e., when the loading signal LDEN goes low while the FRAME signal remains high), the system monitor 204 determines the type of cycle occurring (i.e., read cycle or write cycle) by monitoring the PCI cycle command signals C/BE#. That is, during an ISA sub-bus cycle, PCI bus interface unit 244 drives the PCI cycle command signal C/BE# with an encoded value which indicates the cycle type in accordance with the standardized PCI defined cycle command types.

PCI bus interface unit 244 may drive valid data on PCI bus 220 either one clock cycle after a valid address is driven on PCI bus 220, or may utilize address/data stepping such that either one, or two, or three clock steps are inserted after a valid address before the data is driven on PCI bus 220. A system programmer loads the configuration register 209 (which is mapped at a predetermined address location within the configuration space of computer system 200) with a configuration value which is consistent with the particular address/data stepping function employed by integrated processor 210 during ISA sub-bus cycles, as explained previously. Consequently, depending upon the value within configuration register 209, when system monitor 204 detects a write cycle to an address that must be shadowed within power management unit 202, the power management state machine 206 causes the system monitor 204 to latch-in the data from PCI bus 220 upon either the PCI clock cycle immediately following the address cycle, or upon either one, two, or three clock cycles later. During the data phase of the PCI cycle, the byte enable signals of the PCI bus are further decoded by system monitor 204 to determine the specific bytes to be shadowed within configuration register 209 (only valid bytes are shadowed).

It is noted that an integrated processor employing a sub-bus control unit as described above may also employ a variety of other pin-reducing circuits or techniques. For example, the integrated processor 210 may be configured to employ the power management message bus as described within the co-pending, commonly assigned patent application entitled "Power Management System For an Integrated Processor"; by Wisor, et al.; Serial No. 08/190,292; filed Feb. 2, 1994. This application is incorporated herein by reference in its entirety.

Numerous variations and modifications will become apparent to those skilled in the art once the above disclosure is fully appreciated. For example, although the high performance multiplexed address/data bus 220 of FIG. 2 is a PCI standard bus, other multiplexed high performance buses could be alternatively employed. Furthermore, it is noted that the integrated processor 210 of FIG. 1 may incorporate a variety of additional on-chip peripheral devices. It is intended that the following claims be interpreted to embrace all such variations and modifications.

What is claimed is:

1. A computer system comprising:

a peripheral bus including a plurality of multiplexed address/data lines;

a latch having an input port coupled to said plurality of multiplexed address/data lines;

a data buffer having a first port coupled to said plurality of multiplexed address/data lines;

an integrated processor including:

a CPU core;

a local bus coupled to said CPU core;

a bus interface unit capable of interfacing data, address, and control signals between said local bus and said peripheral bus; and a sub-bus control unit coupled to said bus interface unit and to said latch and capable of generating a loading signal indicative of the presence of a valid address on said peripheral bus;

a peripheral device having a plurality of addressing lines coupled to an output port of said latch, and a plurality of data lines coupled to a second port of said data buffer; and a power management unit coupled to said peripheral bus including:

a power management state machine for managing power within said computer system;

a system monitor coupled to said power management state machine and to said peripheral bus; and a configuration register coupled to said system monitor, wherein said power management unit is configured to use a value stored within said configuration register to control a period of time after an occurrence of an address phase of said peripheral bus at which data from said peripheral bus is shadowed within said power management unit and wherein said power management unit is configured to provide said shadowed data to said peripheral bus.

2. The computer system as recited in claim 1 wherein said peripheral bus is a PCI standard configuration bus.

3. The computer system as recited in claim 1 wherein said data buffer includes a direction control input line, and wherein said sub-bus control unit is capable of generating a direction control signal that is provided to the direction control input line of said data buffer to control a flow of data through said data buffer.

4. The computer system as recited in claim 1 wherein said CPU core implements an 80486 instruction set.

5. The computer system as recited in claim 3 wherein said sub-bus control unit is further capable of generating an I/O write signal and an I/O read signal, wherein said direction control signal is dependent upon whether said sub-bus control unit asserts said I/O write signal or said I/O read signal.

6. The computer system as recited in claim 1 wherein said loading signal is asserted during an address phase of said peripheral bus and wherein said loading signal is deasserted prior to a data phase of said peripheral bus.

7. The computer system as recited in claim 2 wherein said peripheral device is an ISA standard peripheral device.

8. The computer system as recited in claim 3 wherein said sub-bus control unit is further capable of asserting a data enable signal that is received by said data buffer to enable the flow of data through said data buffer.

9. The computer system as recited in claim 1 wherein said loading signal is provided to an enable control line of said latch.

10. The computer system as recited in claim 9 wherein a peripheral bus clock signal is provided to a clock input line of said latch.

11. The computer system as recited in claim 1 wherein said sub-bus control unit is further capable of asserting a select signal for selecting said peripheral device.

12. The computer system as recited in claim 5 wherein said I/O read signal is asserted during a read cycle to said peripheral device, and wherein said I/O read signal makes a transition from an asserted state to a deasserted state when valid read data is present on said multiplexed address/data lines.

13. The computer system as recited in claim 1 further comprising a decoder coupled to said sub-bus control unit, wherein said sub-bus control unit generates an encoded chip select value, and wherein said decoder decodes said encoded chip select value and generates a corresponding chip select signal that is provided to said peripheral device.

* * * * *